United States Patent
Pfeiffer et al.

(10) Patent No.: US 8,453,954 B2
(45) Date of Patent: Jun. 4, 2013

(54) METHOD FOR ALIGNING A CUTTER SPINDLE OF A GRANULATOR AND A GRANULATOR FOR PRODUCING PLASTIC GRANULATE

(75) Inventors: Armin Pfeiffer, Celle (DE); Thorsten Weber, Hameln (DE); Jürgen Voigt, Uetze (DE)

(73) Assignee: KraussMaffei Berstorff GmbH, Hannover (DE)

( * ) Notice: Subject to any disclaimer, the term of this patent is extended or adjusted under 35 U.S.C. 154(b) by 327 days.

(21) Appl. No.: 12/988,364

(22) PCT Filed: Apr. 14, 2009

(86) PCT No.: PCT/EP2009/054374
§ 371 (c)(1),
(2), (4) Date: Oct. 18, 2010

(87) PCT Pub. No.: WO2009/130138
PCT Pub. Date: Oct. 29, 2009

(65) Prior Publication Data
US 2011/0031337 A1    Feb. 10, 2011

(30) Foreign Application Priority Data

Apr. 23, 2008    (DE) .................... 10 2008 020 502

(51) Int. Cl.
*B02C 25/00* (2006.01)
*B02C 23/00* (2006.01)

(52) U.S. Cl.
USPC .................... 241/30; 241/33; 241/37

(58) Field of Classification Search
USPC ................................ 241/30, 33, 37
See application file for complete search history.

(56) References Cited

U.S. PATENT DOCUMENTS

| 4,402,463 | A * | 9/1983 | Kahmann et al. | 241/37 |
| 7,309,036 | B2 * | 12/2007 | Crossley et al. | 241/33 |
| 7,845,583 | B2 * | 12/2010 | Svedberg et al. | 241/30 |
| 2004/0080066 | A1 | 4/2004 | Klammer et al. | |
| 2007/0125891 | A1 * | 6/2007 | Crossley et al. | 241/30 |

FOREIGN PATENT DOCUMENTS

| AT | 410 072 B | 1/2003 |
| DE | 203 00 009 U1 | 5/2004 |
| DE | 10 2004 020 898 | 11/2005 |
| EP | 0 418 941 A | 3/1991 |
| WO | WO 02/100621 | 12/2002 |

* cited by examiner

*Primary Examiner* — Faye Francis
(74) *Attorney, Agent, or Firm* — Henry M. Feiereisen LLC

(57) ABSTRACT

A method for aligning a cutter spindle of a granulator, particularly an underwater granulator, relative to a cutting plate includes rotationally driving the cutter spindle with a drive motor, measuring a force acting on the cutter spindle, generating a corresponding signal, and adjusting especially the angular alignment of the cutter spindle relative to the cutting plate as a function of the signal by pivoting the cutter spindle about at least two pivot axes which enclose an angle with each other A granulator, particularly an underwater granulator, for producing plastic granulate, has a cutting box and a cutter spindle, a cutter holder rotatably received in the cutting box, and a drive motor connected to the cutter spindle, and is configured to perform the aforedescribed method.

22 Claims, 1 Drawing Sheet

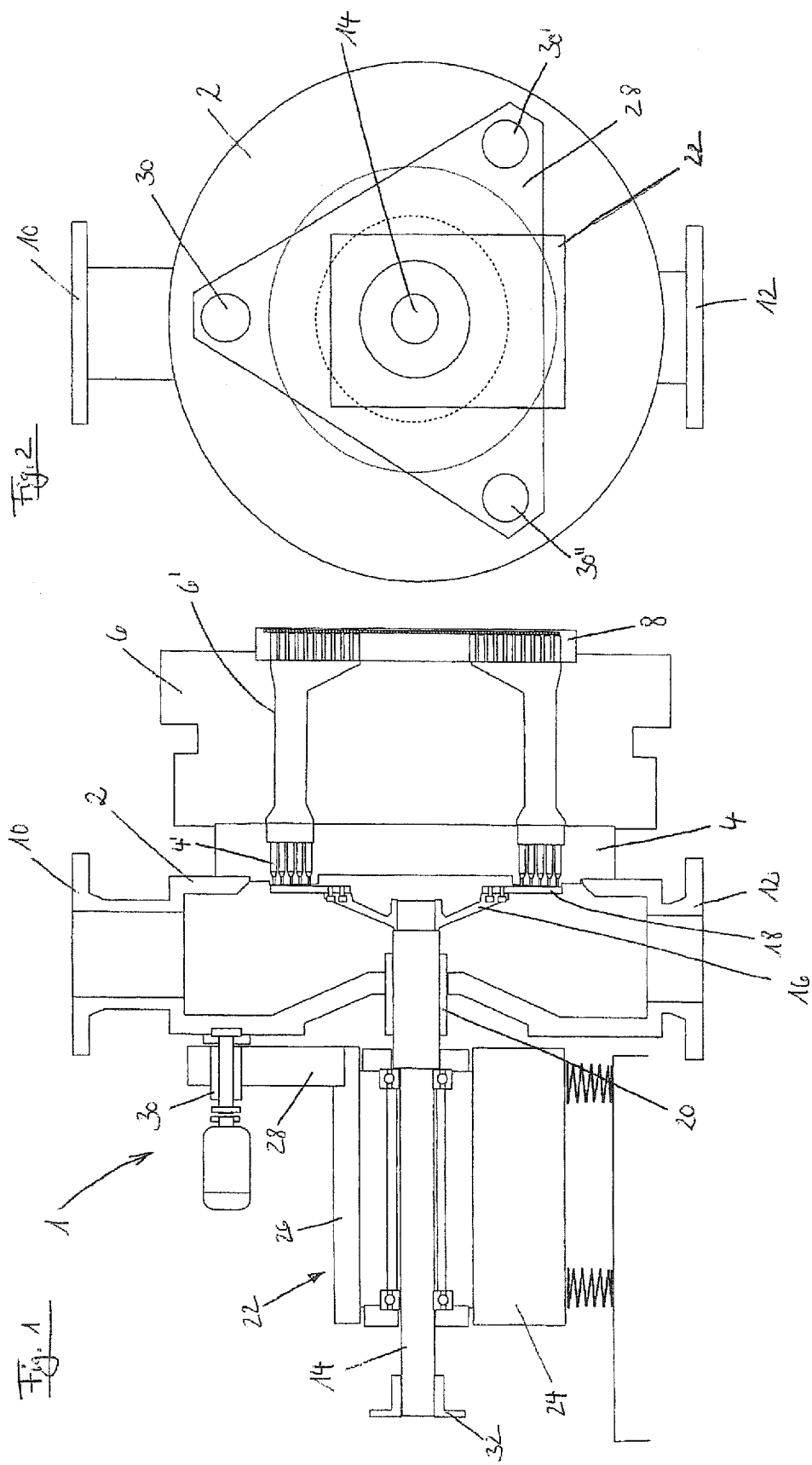

METHOD FOR ALIGNING A CUTTER SPINDLE OF A GRANULATOR AND A GRANULATOR FOR PRODUCING PLASTIC GRANULATE

CROSS-REFERENCES TO RELATED APPLICATIONS

This application is the U.S. National Stage of International Application No. PCT/EP2009/054374, filed Apr. 14, 2009, which designated the United States and has been published as International Publication No. WO 2009/130138 and which claims the priority of German Patent Application, Serial No. 10 2008 020 502.8-16, filed Apr. 23, 2008, pursuant to 35 U.S.C. 119(a)-(d).

BACKGROUND OF THE INVENTION

The present invention relates to a method for aligning a cutter spindle of the granulator and in particular a submerged granulator relative to a cutting plate. The invention also relates to a granulator and in particular to a submerged granulator for producing plastic granulate, which has a cutting box and a cutter spindle, on which a cutter holder is supported which is rotatably received in the cutting box, and a drive motor connectable with the cutter spindle, wherein during operation the cutter holder cooperates with a cutting plate.

Granulators, in particular submerged granulators, are used for producing plastic granulate. Plasticized thermoplastic material is hereby pressed through a cutting plate having suitable openings and is stripped or cut off by cutters moving past the openings, wherein the cutters are typically held by a cutter holder. In a submerged granulator, the produced granulate in form of short plastic strands is cooled by a water stream which simultaneously transports it away from the cutting region. The cutting process is typically performed by rotating cutters which rotate in front of openings disposed in a cutting plate. The cutter holder holding the cutters rotates in front of the cutting plate. The openings are usually substantially circular and disposed in a cutting region, across which the cutters move, in the preferably heated cutting plate.

The quality of the granulate produced in this manner must meet high quality standards. In particular, the produced granulate should be uniform and pourable. It is particular important for attaining a high-quality of the produced granulate that the distance between the cutters to the surface of the cutting plate having the opening is as small and as uniform as possible. The greater the distance, the more frequently the granulates can produce fuzz or fibers, i.e., lacerated edge regions which would hamper a good pourability.

To provide both a granulate of good quality as well as a high reliability of the process, it must be ensured that the distance between the cutter and the surface of the cutting plate is as small and as uniform as possible. The cutter spindle which rotatably supports the cutter holder must have the most advantageous and essentially perpendicular alignment with respect to the surface of the cutting plate.

These requirements become even more important with increasing facility size and hence also the increase in the diameter of the circular holes in the cutting plate. Poor alignment can quickly cause at least in certain regions an overly large cutting gap. For example, with poor alignment the cutters may contact the cutting plate, for example, in a region of the circumference of the traversed arc, which may cause uneven wear, whereas a larger gap is created in another region, resulting in poor quality of the granulate. In addition, in particular with high throughput, each idle time represents a significant economic loss, because each facility which processes, for example, 50 t/h, produces daily about 1,200,000 kg polymer granulate. Such granulate facility includes generally at least one extruder, at least one granulator, and downstream devices for further processing of the granulate.

Until now, the cutter spindle position was measured with the granulator at rest and manually corrected through adjustment of support threads. For example, one side of the cutting chamber, in which the cutter holder including the cutters is rotatably received in front of the cutting plate, was opened to correct the alignment. The measurement accuracy is here in a range of 0.01 mm, so that the alignment accuracy is also in that order of magnitude, but maybe generally greater, for example in a range of 0.03 mm.

However, this alignment is not performed during operation, but when the granulator is at rest. However, disturbances occur during operation, for example extreme temperature differences between the cutting plate, which can have a temperature in excess of 200° C., and the cutting space, which must have a temperature so that the produced granulate quickly cools down and solidifies. In particular, with submerged granulators, where water flows through the cutting space, the temperatures in the cutting space are frequently less than 50° C. In addition, the water pressure also affects the alignment. Due to these disturbances, which may cause, for example, elastic deformations and differences in the thermal expansion of individual components of more than 0.01 mm, the adjustment accuracy is additionally reduced. Keeping in mind that the maximally allowed cutting gap, where adequate quality can be assured, is about 0.1 mm, it can be readily seen that it is very difficult to maintain a constant cutting gap across the entire cutting plate.

To solve this problem and to guarantee a constant end particularly minimum cutting gap, a gimbal mount of the cutting head with constant contact pressure is frequently employed. This means that there is contact between the cutters and the cutting plate and a contact pressure is constantly applied, causing premature wear of the cutters.

SUMMARY OF THE INVENTION

It is therefore an object of the present invention to provide a method and a device capable for ensuring that the produced granulate has a constant good to optimal quality, even when using large granulators with high throughput, wherein some alignment can be performed in a completely assembled state and particularly during operation of the device.

This object is solved by the method according to claim 1 and by the device according to claim 14.

The method of the invention for aligning a cutter spindle of a granulator, and in particular of a submerged granulator, relative to a cutting plate, includes the following steps. The cutter spindle is rotatably driven by a drive motor. This is preferably done during operation, meaning continuously. In this way, the operating parameter and the resulting disturbances can be taken into consideration accordingly. This applies particularly to submerged granulators which have in addition to the operating pressure of the water a particularly high temperature difference between the cutting plate and the cutting space located in front of the cutting place, in which the cutter holder with the cutters is rotatably held.

Thereafter, the force acting upon the cutter spindle is measured. This can be done in several ways, with the particular consideration that not necessarily the absolute force needs to be measured, but rather only an indicator that a force acts upon the spindle. In particular, the force component acting between the cutter spindle and the cutting plate has to be considered. In particular, detecting such force is an indication of contact between the cutters on the cutter holder and the cutting plate. Such force can also be measured, for example, by way of an additional torque. This measurement is preferably performed continuously.

A corresponding signal can be generated from be measured force, wherein the signal is preferably indicative for the applied force; however, the signal may also only indicate for the existence of such force, in particular in the direction of the cutter spindle. Such signal can be displayed, for example, on a display screen and the like.

Thereafter, depending on the signal, an alignment of the cutter spindle relative to the cutting plate is adjusted. This means that based on the detection of a force acting upon the cutter spindle, a corresponding alignment and in particular an angular alignment of the cutter spindle relative to the cutting plate is performed.

With the method according to the invention, this alignment can advantageously be performed during operation of the granulator, so that disturbances can be optimally taken into consideration. There is no longer a need to perform a preliminary "dry" adjustment whose accuracy during operation can only be tested based on the quality of the granulate, and wherein possibly additional downtimes of the device may be required to further optimize the alignment.

The method of the invention has the additional advantage that a new alignment or subsequent adjustment can be performed in regular intervals, without requiring shutdown of the granulator. In this way, expensive downtimes of the granulator and the cooperating extrusion system as well as of optional downstream facilities can be effectively eliminated.

For example, after a "dry" pre-adjustment when the granulator or of the entire granulator system is first set up, i.e., a close alignment of the granulator and the cutter spindle on the cutting plate, the fine alignment and any subsequent alignment can be performed essentially during operation and does not require a shutdown of the granulator system. The granulator system needs to be shut down only when exchanging the cutters, for example due to wear.

According to a preferred modified embodiment of the invention, the alignment and particularly the angular alignment is performed through actuation of adjusting means. This adjusting means may be controllable by, for example, a motor, in particular an electric motor, or hydraulically or thermally or pneumatically or manually.

In a particularly preferred embodiment, the method of the invention may include the following additional steps: while the cutter spindle is driven and a force acting upon the cutter spindle is measured, a corresponding signal is generated and a first adjusting means is operated until the generated signal exceeds a predetermined threshold. As soon as this threshold is exceeded, the first adjusting means is operated in the opposite direction, until the generated signal becomes smaller than the predetermined threshold. This threshold can correspond to the same threshold as the threshold set for the original actuation; however, depending on the measurement method, different threshold values may also be defined.

Thereafter, a second adjusting means is operated, until the generated signal indicating the force between the cutter spindle and the cutting plate exceeds a predetermined threshold. This threshold can have the same value as the threshold defined for the first adjusting means. The second adjusting means is then operated in the opposite direction, until the generated signal becomes smaller than a predetermined threshold.

Accordingly, one or several thresholds or threshold values are defined in advance, which provide information about a force acting upon the cutter spindle and which more particularly measure when a contact is established between the cutter spindle or the cutters held, for example, in a cutter holder and the cutting plate.

When the first adjusting means has been operated until contact is established between the cutters held on the cutter spindle and the cutting plate, the adjusting means is operated in the opposite direction in order to raise the cutters again, so that a minimum gap instead of a complete contact exists between the cutters and the cutting plate. This represents only be a very small movement in the opposite direction. A second adjusting means is then operated in the same manner, until due to the produced alignment motion a force is applied on the cutter spindle, in particular through contact between the cutter and the cutting plate, which is indicated when the generated signal exceeds a threshold. The second adjusting means is then operated in the opposite direction, like the first adjusting means, until the signal becomes smaller than a predetermined threshold, which may be the same threshold. In particular, the adjusting means engage here at different points in the space, thus causing different alignment movements.

In a particularly preferred embodiment, a third adjusting means is operated in a similar manner as the first two adjusting means, until the generated signal exceeds a predetermined threshold and is thereafter actuated in the opposite direction, until the generated signal again falls below a predetermined threshold, which is generally the same threshold. In other words, the alignment of the cutter spindle, and particularly the angular alignment, is adjusted with each adjusting means, until a signal of suitable strength is generated which typically indicates that contact between the cutters and the cutting plate has been established, whereafter the contact is relieved by a small reverse movement.

Because this is done with different adjusting means, the so-called zero-gap-position, in which there is just no contact between the cutters and the cutting plate, can be easily and effectively determined. Alignment is particularly simplified by providing and using three adjusting means, which preferably act upon different points of attack relative to the cutter spindle. After the respective actuation, the adjusting means are generally fixed to ensure an unmovable alignment of the cutter spindle relative to the cutting plate.

Advantageously, the cutter spindle can be aligned along its longitudinal axis by simultaneously and in particular uniformly operating all adjusting means, which can be used to effectively compensate cutter wear.

In a particularly preferred embodiment, the alignment, and in particular the angular alignment, is adjusted by pivoting the cutter spindle about at least two and in particular three pivot axes, which enclose an angle with each other. In this way, the position of the cutter spindle and in particular its alignment relative to the cutting plate in space can be unambiguously established, and a perpendicular arrangement of the cutter spindle or a substantially parallel arrangement of the cutter blades relative to the cutting plate or its surface can be ensured.

Advantageously, the pivot axes are substantially parallel to the cutting plate and are hence also substantially perpendicular to the longitudinal axis of the cutter spindle. Preferably, the pivot axes may be located in a single plane extending parallel to the cutting plate. In this way, the alignment becomes particularly simple.

A force operating on the cutter spindle is preferably measured by measuring the current drawn by the drive motor. As soon as contact between the cutters and the cutting plate is established, the current drawn by the drive motor increases due to the increasing resistance and the resulting increase in the torque, representing a good indication for contact and hence for a force acting upon the cutter spindle. Because the drive motor already operates continuously, this quantity can preferably be measured as indicator, because no additional sensors are then required which may cause problems. Alternatively, other quantities representing the force acting upon the cutter spindle may be measured, for example by using pressure sensors in the cutting plate or in the region of the cutter holder or the cutter spindle. For example, a load cell may be provided in the region of the cutter spindle. A torque which increases due to the contact and is indicative of a force acting upon the cutter spindle may be measured with other types of torque transducers, for example with strain gauges disposed in the region of the cutter spindle.

According to a preferred modified embodiment of the invention, the alignment, and in particular the angular alignment, can be performed stepwise and, if several adjusting means are provided, in particular alternatingly. In this way, alignment and adjustment of the cutter spindle relative to the cutting plate can be performed in small steps, until a corresponding signal indicates a force acting upon the cutter spindle, whereafter a stepwise movement in the opposite direction eliminates the contact between the cutters and cutting plate. In this way, the cutter spindle is advantageously not excessively deflected based on, for example, a strong movement with only one of the adjusting means, but the ideal position is instead approached in small steps. In particular, the individual steps, and with for example three adjusting means, the individual adjusting means can be moved alternatingly step-by-step, until a threshold is reached which indicates contact. The adjusting means that was actuated last can then be moved slightly in the opposite direction. This procedure, namely movement until contact is established and slight retraction, can be repeated several times for all adjusting means, so that optimal alignment is attained.

In a particularly preferred embodiment, the alignment and in particular the angular alignment is controlled by a program. Accordingly, a control device is provided which measures a force acting upon the cutter spindle, generates a corresponding signal and sets dependent thereof the alignment of the cutter spindle relative to the cutting plate, and more particularly controls the adjusting means. The adjusting means may be, for example, adjusting means configured to change the alignment of the cutter spindle with respect to the cutting plate by using servomotors. The granulator housing is hereby aligned with respect to the cutting plate, wherein the cutter spindle would have to have a fixed relation with respect to the angular and axial alignment relative to the cutting box. Alternatively, for example a bearing housing in which the cutter spindle is supported, can be aligned relative to the cutting box. The alignment can also be performed, for example, with hydraulic cylinders or heated bolts, whereby the thermal expansion coefficient of the bolts is used for the alignment.

According to the particular preferred embodiment of the method of the invention, the force acting upon the cutter spindle is measured continuously. In this way, it can be continuously checked if there are any irregularities, and more particularly, if contact is established between the cutter blades and the cutting plate. If contact is established, for example, an alarm can be sounded which prompts a check of the alignment, or if the signal decreases, for example due to increasing distance between cutters and cutting plate caused by wear of the cutters, a new alignment can be performed automatically.

It is particularly advantageous with the present method of the invention that alignment is performed during operation of the granulator and in particular of the submerged granulator, so that operating parameters and in particular the effects produced by the operating parameters, for example deformation due to temperature differences or water pressure acting upon the cutting box and the spindle can be optimally considered. In addition to an initial alignment under operating conditions, continuous tracking and realignment can be performed during operation, allowing compensating, on one hand, inaccuracies in real-time and, on the other hand, wear of the cutters. For example, an automatic readjustment can be performed under program control in regular predetermined intervals.

The present invention also relates to a granulator, in particular a submerged granulator, for producing plastic granulate with a cutting box and a cutter spindle, on which a cutter holder rotatably received in the cutting box is supported. The cutter holder cooperates during operation with a cutting plate. A drive motor is connectable with the cutter spindle. According to the invention, means are provided for measuring a force acting upon the cutter spindle, means for generating a corresponding signal and adjusting means for adjusting the alignment, and in particular the angular alignment, of the cutter spindle relative to the cutting plate depending on the generated signal.

With such granulator, the cutter spindle can be easily aligned relative to the cutting plate during operation, with the cutters disposed on the cutter holder connected with the cutter spindle rotating past the cutting plate. In this way, a high quality of the granulate which correlates with the constant and small gap between cutters and cutting plate, can be ensured, while simultaneously reducing downtimes of the corresponding granulate facility.

Preferably, the adjusting means are attached to a bearing housing and in particular a bearing plate of the cutter spindle. Preferably, the cutter spindle is radially and axially supported outside the cutting box of the granulator in a separate bearing housing, wherein the bearing housing itself is frequently elastically supported so as to be able to follow the adjustment movements of the cutter spindle. The bearing housing can be constructed essentially in two parts and may include, for example, an elastically supported base on which a top part of the housing is mounted. The top part of the housing is axially movable by way of a carriage to allow axial adjustment of the cutter spindle. In a particularly preferred embodiment, a bearing plate can be fixedly connected with the bearing housing or at least a part thereof, in which the cutter spindle is supported. The bearing plate can provide suitable attachment points due to a predefined shape, for example a triangular shape, which enables a particularly good alignment of the bearing housing relative to the cutting box. The cutting box can then be fixedly connected with the cutting plate, providing a good seal between the cutting box and the cutting plate. The feedthrough of the cutter spindle into the cutting box can be designed to allow small displacements and angular adjustments whilst still providing an essentially tight seal, which is of particular importance with submerged granulators.

According to a particularly preferred embodiment, three adjusting means are provided for the alignment. The position of the cutter spindle in space can be unambiguously defined by three points in space which are defined by the adjusting means. Three adjusting means are preferably arranged in the circumferential direction symmetrically with respect to the cutter spindle. For example, they may be arranged at the corners of a isosceles triangle, wherein for example a bearing plate connected with the bearing housing may have a substantially triangular shape, with the adjusting means attached at its corners. During adjustment processes, two of the three adjusting means may be temporarily fixed, while the third adjusting means is moved relatively.

Preferably, the adjusting means can be controlled with a motor, or hydraulically or thermally or pneumatically or manually. Particularly preferred, the adjusting means may also be adjustable automatically depending on the generated signal. Advantageously, for example, the adjusting means may employ servomotor-operated spindle drives. The spindles may be rotatably supported in a wall of the cutting box and cooperate with a nut in the region of the bearing plates. The cutter spindle can be adjusted relative to the cutting plate by adjusting the distances, particularly at three different points in space between the bearing housing and the cutting box, or alternatively between the cutting box and the cutting plate. In particular, axial alignment can be attained through common actuation of the adjusting means, whereas angular alignment of the cutter spindle relative to the cutting plate or its surface can be attained through separate actuation.

According to a particularly preferred embodiment of the granulator according to the invention, a control device is provided for controlling the adjusting means, with the control device operating depending on the generated signals and performing a corresponding alignment of the cutter spindle relative to the cutting plate. This is preferably also done during operation. Advantageously, the adjusting means may be controlled automatically, and a readjustment may be performed, for example, in regular predetermined intervals. In addition, during an initial set-up of the granulator according to the invention, alignment can be performed essentially automatically due to the suitable configured control device, so that a rapid and correct alignment of the cutter spindle relative to the cutting plate can be attained, allowing the regular production to begin.

According to a preferred mortification of the present invention, means for measuring the motor current of the drive motor are provided which operate as means for measuring a force acting upon the cutter spindle. The motor current is an easily measurable and reliable indicator for indicating contact between the cutters on the cutter holder and the cutting plate and/or for indicating a very small distance therebetween, because the drawn current increases due to an increase of the torque. Advantageously, no additional sensors need to be provided in the region of the cutting plate or the cutter spindle, making the granulator less error-prone.

BRIEF DESCRIPTION OF THE DRAWING

An exemplary embodiment of the present invention illustrated in the following drawings will now be described.

FIG. 1 shows a schematic cross-sectional view of a submerged granulator according to the invention; and FIG. 2 shows a schematic top view of the submerged granulator.

DETAILED DESCRIPTION OF PREFERRED EMBODIMENTS

FIG. 1 shows in a cross-sectional view a submerged granulator 1 which includes a cutting box 2 in which a cutter holder 16 with cutters 18 is rotatably supported. The cutters 18 rotate with a very small to vanishing distance from the cutting plate 4 and the exits of the openings 4' disposed in the cutting plate. The cutting plate 4 is connected with a nozzle flange 6 of an unillustrated extruder. The nozzle flange 6 includes connecting channels 6' through which the melt from the extruder is supplied to the openings 4' in the cutting plate 4. Before the melt enters the connecting channels 6', it passes through a melt filter 8 to remove any contamination and to prevent the openings 4' from clogging. The cutting box 2 and the cutting plate 4 are fixedly connected with each other, also the cutting plate 4 and the nozzle flange 6. The melt which exits the openings 4' in form of strands is cut by the rotating cutters 18 and forms the granulate. Cooling water is introduced into the cutting box 2 via a water supply 12, which immediately cools the produced granulate and transports it away from the cutting surface. This occurs via a water discharge 10, through which the cooling water including the granulate reaches corresponding downstream devices.

The cutter holder 16 is connected with a cutter spindle 14 which projects into the cutting box via interposed sealing means 20. The sealing means 20 are constructed to tolerate small axial and angular displacement of the spindle with respect to the wall of the cutting box 2, while maintaining the sealing effect. The cutter spindle 14 is rotatably supported in a bearing housing 22 and connected via a coupling 32 with an unillustrated drive motor.

The bearing housing 22 includes a bearing housing base 24 which is elastically connected with a machine table or the like. A bearing housing carriage 26 is supported on the bearing housing base 24 for axial displacement. The bearing housing carriage defines the axial position of the cutter spindle 14. A substantially triangular bearing plate 28 is fixedly connected with the bearing housing carriage 26, with adjusting means 30 provided on the bearing plate 28, which cooperate with the cutting box 2 and define the relative position of the bearing housing carriage and the bearing housing 22, respectively, and hence of the cutter spindle 14 relative to the cutting plate 4.

FIG. 2 shows the submerged granulator according to the invention schematically in a top view. The cutting box 2 is supplied with cooling water via the water supply 12, and the produced granulate and the heated cooling water are discharged via the water discharge 10. The cutter spindle 14 is shown in cross-section; the circle traversed by the cutters 18 on the cutting plate 4 is schematically illustrated, in which region the openings 4' for the extrusion of the melt strands are located. The bearing housing 22 is only shown schematically; the bearing plate 28 which is fixedly connected with the bearing housing carriage 26 has a substantially triangular basic shape; the adjusting means 30 are attached at the corners of the triangle, symmetrically along the circumference with respect to the cutter spindle 14.

For a satisfactory operation of the submerged granulator according to the invention, the cutter spindle 14 must be aligned as exactly as possible relative to the cutting plate 4; in particular, the distance between the cutters 18 and the surface of the cutting plate 4 across which the cutters pass must not be too large in the region of the openings 4', but should be as constant as possible and minimal. The measurement and adjustment accuracy should preferable be in a range of 0.01 mm. Starting from a correct alignment of the cutter holder 16 and the cutters 18 relative to the cutter spindle 14, the cutter spindle 14 should be oriented substantially perpendicular to the cutting plate 4. Due to disturbances during operation, for example temperature differences between the cutting box 2 and the cutting plate caused by, on one hand, the cooling water in the cutting box 2 and, on the other hand, by heating of the cutting blade 4 by the melt and optionally additional heating, as well as the pressure of the of flowing water, the cutter spindle 14 can not be exactly adjusted relative to the cutting plate in the "dry" state, i.e., outside the operation.

Instead, a pre-alignment must be performed which can only be readjusted during operation. According to a preferred embodiment of the invention, this is done by continuously measuring the current drawn by the drive motor, because a sudden increase in the current is an unambiguous indication for contact between the cutters 18 and the cutting plate 4. The alignment of the cutter spindle 14 is defined by three support points, namely the points where the adjusting means 30, 30', 30" are attached to the bearing plate 28. By stepwise adjustment of one of the adjusting means 30 and hence by changing the distance between the bearing plate 28 relative to the cutting box 2 and hence to the cutting plate 4, the alignment of the cutter spindle 14 is pivoted about an axis oriented parallel to the surface of the cutting plate. This adjustment is continued until the current drawn by the drive motor shows a corresponding increase, indicating contact between the cutters 18 and the cutting plate 4. When a corresponding signal is generated, the pivoting operation is performed with the corresponding adjusting means 30 in the opposite direction. This is only a very small reverse movement to ensure that there is just no contact between the cutters 18 and the cutting plate 4.

Now the process continues at a second support point, which is preferably rotated by 60°, as indicated in the Figure, so that the pivot axis is also essentially rotated by 60° with respect to the first pivot axis and is also parallel to the surface of the cutting plate 4. The corresponding adjusting means 30' is adjusted stepwise, so that the bearing plate 28 and hence the bearing housing 22 and the cutter spindle 14 is pivoted relative to the cutting plate, until a corresponding signal indicates an increase of the current drawn by the drive motor and hence contact between the cutters 18 and the cutting plate 4. The corresponding adjusting means 30' is again moved slightly into the opposite direction, so as to just prevent contact.

The same process is performed at the third support point, which has a pivot axis that is rotated relative to the first two pivot axes. In this case, the corresponding adjusting means 30" is also adjusted stepwise until a signal indicates contact between the cutters 18 and the cutting plate 4, whereafter the adjusting means 30" is moved slightly in the opposite direction. This guarantees an optimal perpendicular alignment of the cutter spindle 14 relative to the cutting plate, where only a minimum gap between cutters 18 and the surface of the cutting plate 4 is present, so that granulate with optimal quality can be cut.

For an axial alignment of the cutter spindle 14 relative to the cutting plate 4, all adjusting means 30, 30', 30" may be adjusted simultaneously to the same degree, which changes the axial position of the cutter spindle 14 relative to the cutting plate 4, without changing the angular alignment. In this case, the bearing housing carriage 26 would be moved relative to the bearing housing base 24 and thereafter secured by the adjusting means 30, 30', 30" in the attained position, which is again found by measuring an increase in the motor current and a slight reverse movement.

In particular, the adjusting means 30, 30', 30" may be spindle drives operated by servomotors, which are automatically controlled by a suitable configured controller depending on the signal produced by the drawn motor current and optionally by the operating time.

For an angular alignment of the cutter spindle 14 relative to the cutting plate 4, the elastic linkage between the bearing housing 22 and the base ensures that these generally small pivot angles can be compensated. The sealing means 20 also support such corrections in the axial and the angular position. The coupling 32 is configured so that the slight angular or distance changes between cutter spindle and the unillustrated drive motor can be compensated.

The alignment can also be performed several times, in particular during the initial start-up of the granulator after extended downtimes, in order to improve the alignment accuracy. In addition, the alignment can be repeated in regular intervals, which are preferably determined by experience, in order to ensure an optimal distance between the cutters 18 of the surface of the cutting plate 4 also over longer periods of time. Advantageously, an axial alignment of the cutter spindle 14 relative to the cutting plate 4 can be checked, which is useful for compensate for wear of the cutters during operation.

The invention claimed is:

1. A method for aligning a cutter spindle of a granulator relative to a cutting plate, comprising the steps of:
    rotationally driving the cutter spindle with a drive motor,
    measuring a force acting on the cutter spindle,
    generating a signal in response to the measured force, and
    adjusting an alignment of the cutter spindle relative to a cutting plate by operating adjusting means depending on the generated signal, with the adjusting means pivoting the cutter spindle about at least two pivot axes which enclose an angle with each other.

2. The method of claim 1, wherein the alignment is an angular alignment.

3. The method of claim 1, further comprising the steps of:
    operating a first adjusting means until the generated signal exceeds a predetermined threshold,
    operating the first adjusting means in an opposite direction, until the generated signal falls below a predetermined threshold,
    operating a second adjusting means until the generated signal exceeds a predetermined threshold,
    operating the second adjusting means in an opposite direction, until the generated signal falls below a predetermined threshold.

4. The method of claim 3, further comprising the steps of:
    operating a third adjusting means until the generated signal exceeds a predetermined threshold,
    operating the third adjusting means in an opposite direction, until the generated signal falls below a predetermined threshold.

5. The method of claim 1, wherein the cutter spindle is aligned along its longitudinal axis by simultaneous operation of the adjusting means.

6. The method of claim 1, wherein the adjustment of the alignment of the cutter spindle is performed by pivoting the cutter spindle about three pivot axes which enclose an angle with each other.

7. The method of claim 1, wherein the pivot axes are substantially parallel to the cutting plate.

8. The method of claim 1, wherein the pivot axes are located in a plane.

9. The method of claim 1, wherein the force acting upon the cutter spindle is measured by measuring the current drawn by the drive motor or with a load cell.

10. The method of claim 1, wherein the adjusting means are moved in steps, until the signal reaches a threshold indicating contact between the cutter spindle and the cutting plate.

11. The method of claim 1, wherein the alignment is adjusted under program control.

12. The method of claim 1, wherein the alignment is adjusted during operation of the granulator.

13. The method of claim 1, wherein the force acting upon the cutter spindle is measured continuously.

14. The method of claim 1, wherein the granulator is a submerged granulator.

15. A granulator for producing plastic granulate, comprising:
    a cutting box,
    a cutter spindle, a cutter holder rotatably disposed in the cutting box and held by the cutter spindle, with the cutter holder cooperating with a cutting plate during operation, a drive motor connected with the cutter spindle, means for measuring a force acting upon the cutter spindle, means for generating a signal corresponding to the force, and adjusting means for adjusting alignment of the cutter spindle relative to the cutting plate by operating adjusting means depending on the signal, with the adjusting means pivoting the cutter spindle about at least two pivot axes which enclose an angle with each other.

16. The granulator of claim 15, further comprising a bearing housing coupled to the adjusting means.

17. The granulator of claim 15, further comprising a bearing plate coupled to the adjusting means.

18. The granulator of claim 15, comprising three adjusting means arranged in a circumferential direction symmetrically with respect to the cutter spindle.

19. The granulator of claim 15, wherein the adjusting means are controlled with a motor, or hydraulically, or thermally, or pneumatically, or manually.

20. The granulator of claim 15, further comprising a control device for controlling the adjusting means depending on the generated signal.

21. The granulator of claim 15, wherein the means for measuring a force acting upon the cutter spindle is constructed as means for recording a motor current of the drive motor.

22. The granulator of claim 15, wherein the granulator is a submerged granulator.

* * * * *